(12) United States Patent
Bertram et al.

(10) Patent No.: US 8,000,435 B2
(45) Date of Patent: Aug. 16, 2011

(54) METHOD AND SYSTEM FOR ERROR COMPENSATION

(75) Inventors: Matthias Bertram, Aachen (DE); Jens Wiegert, Aachen (DE); Steffen G. Wiesner, Cologne (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/625,600

(22) Filed: Nov. 25, 2009

(65) Prior Publication Data

US 2010/0119139 A1 May 13, 2010

Related U.S. Application Data

(63) Continuation-in-part of application No. 12/305,983, filed on Dec. 22, 2008.

(30) Foreign Application Priority Data

Jun. 22, 2006 (EP) .................................. 06115861

(51) Int. Cl.
*A61B 6/00* (2006.01)
(52) U.S. Cl. .................................. 378/7; 378/6; 378/86
(58) Field of Classification Search .................. 378/6, 7, 378/86, 207
See application file for complete search history.

(56) References Cited

U.S. PATENT DOCUMENTS

| | | | |
|---|---|---|---|
| 4,809,172 A | 2/1989 | Hopkinson et al. | |
| 5,270,925 A * | 12/1993 | Stegehuis | 378/7 |
| 5,666,391 A * | 9/1997 | Ohnesorge et al. | 378/7 |
| 6,256,367 B1 * | 7/2001 | Vartanian | 378/7 |
| 6,639,964 B2 * | 10/2003 | Schneider et al. | 378/7 |
| 6,823,043 B2 * | 11/2004 | Fewster et al. | 378/86 |
| 6,879,715 B2 | 4/2005 | Edic et al. | |
| 7,308,072 B2 * | 12/2007 | Ruhrnschopf | 378/7 |
| 7,496,171 B2 * | 2/2009 | Rinkel et al. | 378/7 |
| 7,569,827 B2 * | 8/2009 | Bai et al. | 250/363.04 |
| 2002/0048339 A1 | 4/2002 | Schneider et al. | |
| 2005/0185753 A1 | 8/2005 | Du et al. | |
| 2007/0153970 A1 * | 7/2007 | Harding | 378/4 |

FOREIGN PATENT DOCUMENTS

| | | |
|---|---|---|
| EP | 1363121 A1 | 11/2003 |
| WO | 2004/032047 A2 | 4/2004 |
| WO | 2006/070316 A1 | 7/2006 |
| WO | 2007/148263 A1 | 12/2007 |

OTHER PUBLICATIONS

Endo et al., Effect of scatter radiation on image noise in cone beam CT, Medical Imaging, SPIE, vol. 3977, 2000, pp. 515-522.*

(Continued)

*Primary Examiner* — Edward J Glick
*Assistant Examiner* — Alexander H Taningco

(57) ABSTRACT

A method includes generating a plurality of scatter distributions based on geometric models having different object to detector distances, determining an imaged object to detector distance, and identifying a scatter distribution of the plurality of scatter distributions having a object to detector distance that corresponds to the imaged object to detector distance. The method also includes employing the identified scatter distribution to scatter correct projection data corresponding to the imaged object. Another method includes generating an estimate of wedge scatter by propagating a predetermined wedge scatter profile through an intermediate reconstruction of an object; and employing the estimate to wedge scatter correct the projection data.

20 Claims, 10 Drawing Sheets

OTHER PUBLICATIONS

Wiegert et al., Performance of Standard Fluoroscopy Anti-Scatter Grids in Flat Detector Based Cone Beam CT, Medical Imaging, SPIE, vol. 5368, 2004, pp. 67-78.*

Glover, Compton scatter effects in CT reconstructions, Med Phys, 1982, pp. 860-867.*

Dietmar et al., Methods for beam data acquisition offered by a mini-phantom, Phys Med Biol, 44, 1999, pp. 817-832.*

Wiegert et al., Improved CT image Quality Using a New Fully Physical Imaging Chain, Medical Imaging, Proc of SPIE, vol. 7622, 2010, pp. 1-10.*

Nykanen, K., et al.; X-ray Scattering in Full-field Digital Mammography; 2003; Med. Phys.; 30(7)1864-.

Bertram, et al., Scatter correction for cone-beam computed tomography using simulated object models, Mecial Imaging 2006: Physics of Medical Imaging, 2006, pp. 462-473, vol. 6142, Proceedings of SPIE.

Wiegert, J., et al.; Model Based Scatter Correction for Cone-Beam Computed Tomography; 2005; Proc. of SPIE; vol. 5745; 271.

* cited by examiner

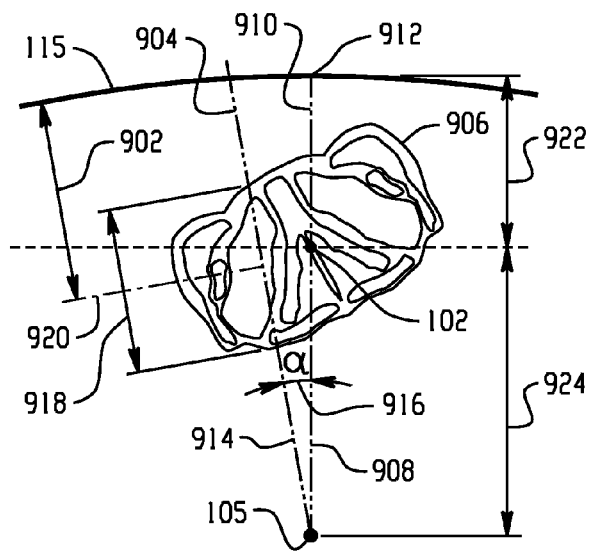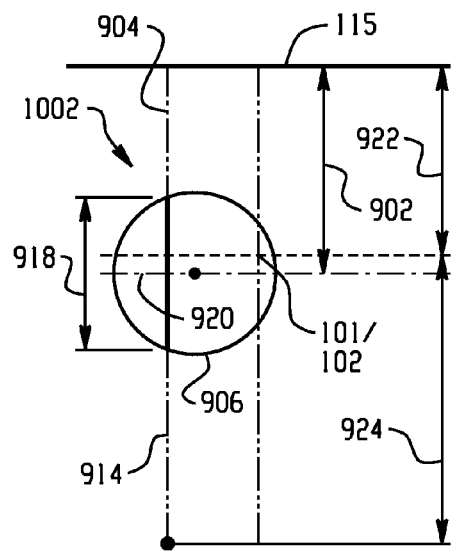
Fig. 9  Fig. 10
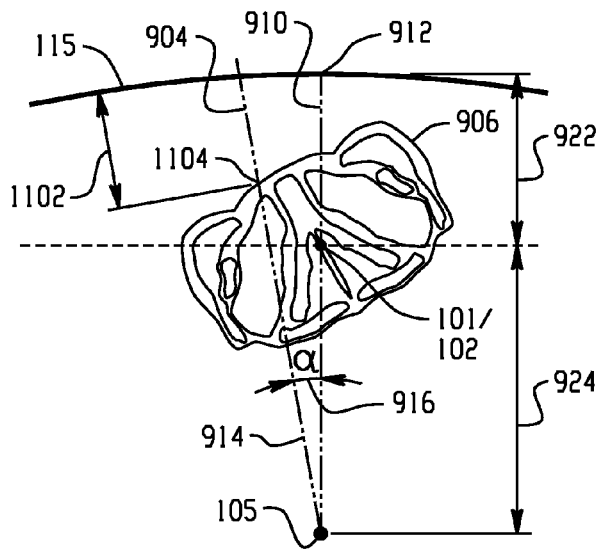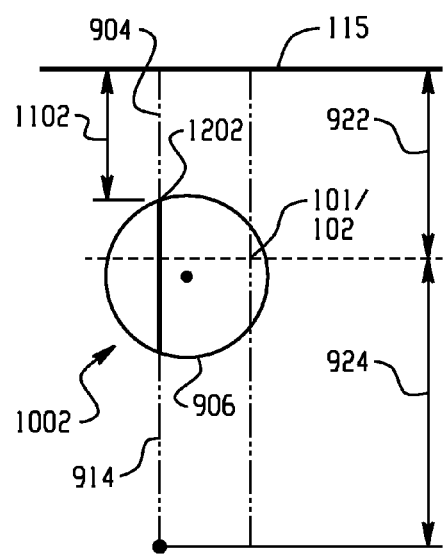
Fig. 11  Fig. 12

METHOD AND SYSTEM FOR ERROR COMPENSATION

CROSS REFERENCE TO RELATED APPLICATIONS

This application is a continuation-in-part (CIP) of application Serial No. 12/305,983, filed Dec. 22, 2008 and entitled "METHOD AND SYSTEM FOR ERROR COMPENSATION," which claims the benefit of PCT application IB2007/052243, filed on Jun. 13, 2007, which claims the benefit of European application 06115861.4, filed on Jun. 22, 2006.

The invention relates to a method for generating a set of kernels, a method and a system for error compensation, a computer readable medium and a program element, in particular to a method for convolution-based error compensation of X-ray scatter.

Computed tomography (CT) is a process of using digital processing to generate a three-dimensional image of the internal of an object under investigation (object of interest, object under examination) from a series of two-dimensional x-ray images taken around a single axis of rotation. The reconstruction of CT images can be done by applying appropriate algorithms.

A basic principle of CT imaging is that projection data of an object under examination are taken by detectors of a CT system. The projection data represent information of the object passed by radiation beams. To generate an image out of the projection data these projection data (line integrals) can be back-projected leading to a two-dimensional image, i.e. representing a disc. Out of a plurality of such two-dimensional images a so-called voxel representation, i.e. a representation of three-dimensional pixels, can be reconstructed. In cases where the detectors are already arranged in the form of a plane, two-dimensional projection data are achieved and the result of the back-projection is a three-dimensional voxel. That is, in modern, more sophisticated so-called "cone-beam" CT and reconstruction methods where the projection data of two-dimensional detectors, i.e. detectors having a plurality of detecting elements arranged in form of a matrix, are directly back-projected into a three-dimensional distribution of voxels in one single reconstruction step.

Scattered radiation is a major source of artifacts in cone-beam X-ray computed tomography. By causing artifacts such as noise, streaks and low-frequent inhomogeneities, so-called cupping, in reconstructed images, scatter impedes visibility of soft contrasts, i.e. portions having low contrasts. Especially in volume imaging using interventional X-ray systems where anti-scatter grids are inefficient, reliable and accurate retrospective methods for scatter compensation are needed. One approach for a correction are the so-called convolution based methods which are frequently used to estimate the scatter background in radiographic images. For example, such convolution based methods are described in "Computerized scatter correction in diagnostic radiology", K. P. Maher and J. F. Malone, Contemporary Physics 38(2), 131-148, 1997.

Although these convolution based correction methods do increase the quality of the reconstructed images, the reconstructed images still exhibit artifacts, in particular in volumetric images.

It may be desirable to provide an alternative method for generating a set of kernels, a method and a system for error compensation, a computer readable medium and a program element which may exhibit greater accuracy in error compensation or may be less prone to artifacts in the reconstructed image.

This need may be met by a method for generating a set of kernels, a method and a system for error compensation, a computer readable medium and a program element according to the independent claims.

According to an exemplary embodiment of a method for generating a set of kernels for convolution error compensation of a projection image of a physical object recorded by an imaging system, the method comprises calculating the set of kernels in such a way that for each pixel of the projection image a generally asymmetric scatter distribution for error compensation is calculated representing the X-ray scatter originating in a volume defined by the beam between an X-ray source and the pixel.

According to an exemplary embodiment a method for error compensation of an image of a physical object comprises receiving an original projection image of an imaged physical object, converting the original projection image into a water-equivalent image (an image of water-equivalent thickness), extracting a number of scalar parameters from said water-equivalent image and possibly its gradient, determining at least one pre-calculated kernel according to an exemplary embodiment of the method for generating a set of kernels by relating the extracted parameters to the parameters of the pre-calculated kernels, and compensating an error of the original projection image by using the determined at least one pre-calculated kernel.

According to an exemplary embodiment a system for error compensation of an image of a physical object comprises a receiving unit adapted to receive an original projection image of an imaged physical object, a calculation unit adapted to convert the original projection image into a water-equivalent image, in particular calculate the corresponding gradient image, and to extract a number of parameters from the images of water-equivalent thickness and in particular of the gradient, an determination unit adapted to determine at least one pre-calculated kernel according to an exemplary embodiment of the method for generating a set of kernels by relating the extracted parameters to the parameters of the pre-calculated kernels, and a compensation unit adapted to compensate an error of the original projection image by using the determined at least one pre-calculated kernel.

According to an exemplary embodiment a tomography apparatus comprises a radiation source, a radiation detector, and a system for error compensating according to an exemplary embodiment, wherein the radiation detector is adapted to record data representing information of the original projection image of the imaged physical object.

According to an exemplary embodiment a computer readable medium is provided in which a program for error compensation of an image of a physical object is stored, which program, when executed by a processor, is adapted to control a method comprising: receiving an original projection image of an imaged physical object, converting the original projection image into a water-equivalent image, determining at least one pre-calculated kernel according to an exemplary embodiment of the method for generating a set of kernels by relating the extracted parameters to the parameters of the pre-calculated kernels, and compensating an error of the original projection image by using the determined at least one pre-calculated kernel.

According to an exemplary embodiment a program element for error compensation of an image of a physical object is provided, which program, when executed by a processor, is adapted to control a method comprising: receiving an original projection image of an imaged physical object, converting the original projection image into a water-equivalent image in particular calculate the corresponding gradient image, extracting a number of scalar parameters from said water-equivalent image and in particular from the gradient image, determining at least one pre-calculated kernel according to an exemplary embodiment of the method for generating a set of kernels by relating the extracted parameters to the parameters of the pre-calculated kernels, and compensating an error of the original projection image by using the determined at least one pre-calculated kernel according to an exemplary embodiment of the method for generating a set of kernels.

It may be seen as the gist of an exemplary embodiment of the present invention that a method for pre-calculating kernels is provided, which kernels adequately accounts for the asymmetry of scatter distributions generated along a ray, in dependence of the position where the ray penetrates the images object. One exemplary aspect of the present invention may be seen in that the present invention accurately accounts for the fact that a large fraction of detected scattered X-ray quanta may originate from regions near the boundary of the imaged physical object and that the scatter distribution generated along the path to such locations may be highly asymmetric. The exemplary embodiment may provide a correction scheme that may offer the potential to much more quantitatively estimate and correct for scatter in radiographic images and projections of cone-beam computer tomography (CT) acquisitions. Thereby, possibly reducing image artifacts and thus possibly enhancing low-contrast visibility, compared to a convolution-based method which does not take into account a dependence on the position where the ray penetrates the images object, e.g. whether the considered pixel relates to a centre of the physical object or to a border region. Preferably, the calculation of the set of kernels is done in such a way that for each pixel of the projection image an asymmetric scatter distribution for error compensation is calculated representing a X-ray scatter originating along a ray from an X-ray source to the pixel, wherein asymmetric may mean that no symmetry axis is existing. In particular, this asymmetry may be existing even in the case no anti-scatter grid is used.

The provided convolution-related scatter estimation scheme (not based on convolution in the strict mathematical sense) uses pre-calculated scatter kernels that determine the scatter contribution of a ray from the X-ray source to a detector element, depending on the object attenuation at that pixel, and on further properties derived from the projection image, such as estimates of the total object size or its maximal depth, or of the attenuation gradient in the water-equivalent image at said pixel. The total scatter image may be obtained by summing up the contributions of all such rays. The kernels may be generated either experimentally or numerically. These kernels may be usable in order to error compensating a projection image $P^{(0)}(x,y)$ which is comprised of a primary portion P and a scatter portion S, i.e. $P^{(0)}(x,y)=P(x,y)+S(x,y)$.

This reconstruction method may be usable in the field of tomography apparatuses, e.g. a computed tomography apparatus, in particular in an X-ray computer tomography.

In the following, further exemplary embodiments of the method for generating a set of kernels will be described. However, these embodiments apply also for the method and the system for error compensation, the tomography apparatus, the computer readable medium and the program element.

According to another exemplary embodiment of the method of generating a set of kernels the set of kernels is experimentally determined by using an X-ray phantom as a model. In particular, in the calculating of the set of kernels results of an experimental measurement might be used.

According to another exemplary embodiment of the method for generating a set of kernels the set of kernels is calculated by using scatter simulations of a geometric model, preferably assuming water-like scattering characteristics, or scattering characteristics of other materials. Preferably, each kernel of the set of kernels is a function of parameters of the geometric model.

That is, for the generation of pre-calculated kernels, normalized scatter distributions K(x,y) may be off-line generated using pencil-beam Monte-Carlo scatter simulations of the geometric model, which may be parameterized in such a way that it takes into account a correct system geometry, e.g. geometry of a tomography system, a correct beam spectrum, e.g. the energy spectrum of the corresponding radiation source of the tomography system, and a correct anti-scatter grid, e.g. whether an anti-scatter grid and which specific anti-scatter grid is used in the tomography system. From these scatter distributions an estimation of a scatter image $S^0(x,y)$ may be obtainable by summing up the pre-calculated contributions for rays impinging on the individual detector pixels in a projection image.

According to another exemplary embodiment of the method for generating a set of kernels at least one of the parameters is a radius of the geometric model. Preferably, the kernel is further a function of a shift between the projected centre of the geometric model and the position where the penetrating pencil beam impinges onto the detector.

That is, for a given system configuration, e.g. tomography system configuration, separate kernels $K_{M,r,\Phi}(x,y)$ may be off-line generated as a function of model parameters M, e.g. at least one radius, and as a function of a positional shift $(r,\Phi)$ of the model with respect to a pencil beam used for the simulation, wherein $(r,\Phi)$ are polar coordinates denoting the shift in a plane parallel to a detector plane of the tomography system. By calculating the kernels as a function of a positional shift $(r,\Phi)$ it may be possible to account for the scatter variation depending on the pixel location, e.g. whether the pixel is a boundary pixel or a centre pixel.

According to another exemplary embodiment of the method for generating a set of kernels the geometric model is an ellipsoidal model. Preferably, each kernel of the set of kernels is a function of $r_1$, $r_2$ and $r_3$ of the geometric model and of a shift $r,\Phi$ between the centre of the model and the position where the pencil beam penetrates the model possibly resulting in a shift between the projected centre of the geometric model and the position where the penetrating pencil beam impinges onto the detector, wherein $r_1$, $r_2$ and $r_3$ may be the half axes of the ellipsoidal model.

For these model parameter M, e.g. $r_1$, $r_2$, and $r_3$ the pre-calculated kernels may be calculated, i.e. the pre-calculated kernels K(x,y) may be calculated as a function of these model parameter M and as a function of a positional shift $(r,\Phi)$ of the model with respect to the pencil beam. For each combination of model parameters $M=(r_1, r_2, r_3)$, scatter kernels $K_{M,r,\Phi}(x,y)$ may be generated under variation of the relative position between pencil beam and ellipsoid model in the plane parallel to the detector, wherein the positional shift of the model ellipsoid with respect to the pencil beam is denoted by the polar coordinates $(r,\Phi)$.

According to another exemplary embodiment of the method for generating a set of kernels the geometric model is a spherical model. Preferably, each kernel of the set of kernels is a function of a radius R of the spherical model and of a shift $r,\Phi$ between the centre of the model and the position where the pencil beam penetrates the model possibly resulting in a shift between the projected centre of the geometric model and the position where the penetrating pencil beam impinges onto the detector.

In the following, further exemplary embodiments of the method for error compensation will be described. However, these embodiments apply also for the method for generating a set of kernels, the system for error compensation, the tomography apparatus, the computer readable medium and the program element.

According to another exemplary embodiment of the method for error compensation the original projection image is normalized.

According to another exemplary embodiment of the method for error compensation each kernel of the set of kernels is a function of a geometry of the imaging system, a beam spectrum of the imaging system and/or anti-scatter grid parameters of the imaging system.

In this context "normalized" denotes the fact that the quantity P denotes the detected intensity of primary radiation normalized by the value for air, so that P=1 corresponds to direct radiation and P=0 corresponds to total absorption. By normalizing the projection image and converting it to a water-equivalent image it may be possible to provide for an efficient way to error compensating images by using pre-calculate kernels.

According to another exemplary embodiment of the method of error compensation the original projection image is converted into a water-equivalent image according $$T(x, y) = \frac{-\ln(P^{(0)}(x, y))}{\mu},$$

wherein $P^{(0)}$ represents the original projection image, $T(x,y)$ represents the image of water-equivalent thickness T, and $\mu$ denoted the appropriate attenuation value of water.

In particular, generating a water-equivalent image may be suitable since water is predominant in a human being, thus leading to a simple but still sufficiently correct model.

According to another exemplary embodiment the method for error compensation further comprises calculating a total scatter at a given pixel of a pixel array by summing up the contributions of all kernels corresponding to all pixels.

Such a summing up of all contributions of all kernels may be an efficient way to calculate the effect of the total scattering contribution on the measured intensity at the given pixel, e.g. the intensity measured at a detector element of a computer tomography apparatus. This total scattering contribution may be afterwards used to compensate errors introduced to the projection image by scattering.

According to another exemplary embodiment of the method for error compensation the total scatter at a given pixel is defined by:

$$S^0(i, j) = w \cdot \sum_{k,l} K_{M,r(k,l),\Phi(k,l)}(i-k, j-l),$$

wherein: $S^0(i, j)$ is the total scatter at pixel $(i,j)$, w denotes the area of the pixel, and $K_{M,r(k,l),\Phi(k,l)}(i-k, j-l)$ is the kernel indicative for the scattering introduced from a ray impinging at pixel $(k,l)$ at the location of pixel $(i,j)$ and depending on: M, which represents the parameters of a geometric model, and $(r,\Phi)$, which represents a positional shift of the geometric model with respect to a centre of the pixel array.

According to another exemplary embodiment of the method for error compensation for the calculation of the kernels an ellipsoidal model is used, wherein M represents the half axes $r_1, r_2, r_3$ of the ellipsoidal model, wherein $r_1=r_2=$sqrt $(A/\pi)$ and $r_3=B$, with A=a maximum cross-sectional area of the physical object, and with B=a maximum thickness of the physical object.

The corresponding parameters $r_1$, $r_2$ and $r_3$ may be extractable from the projection image of the physical image and may represent the half axes of the ellipsoidal geometric model. Preferably, the projection image is converted into an image of water-equivalent thickness T according $$T(x, y) = \frac{-\ln(P^{(0)}(x, y))}{\mu},$$

wherein $P^{(0)}$ represents the original projection image, wherein $T(x,y)$ represents the image of water-equivalent thickness T; and $\mu$ denoted the appropriate attenuation value of water. The parameter A may be specified as the area of the shadow of the physical object on the projection image, e.g. the region in the projection with attenuation above a certain threshold, divided by the square of the system's geometric magnification factor. The parameter B may be specified as the maximum of $T(x,y)$ after low-pass filtering or as a percentile from a histogram of T, which both may minimize the influence of strong attenuation variations. In an alternative embodiment, the model parameters may be determined from a least squares fit of a forward projection of the model to the acquired projection.

It should be noted in this context that for a given model M, different shift values are equivalent to different values of the water-equivalent thickness at the pencil beam position, ranging from the maximal thickness of the model at zero shift down to almost zero thickness at shifts almost equal to the spatial extent of the model. In turn, for simple geometric models and a fixed shift angle $\Phi$, a given value of water thickness T in the considered range unambiguously determines a corresponding value of r, so that in the interval $(0, T_{max}]$, r(T) can be assumed to be a unique function.

For this embodiment, consider the scatter contribution of a ray impinging on the detector pixel with indices $(k,l)$. At the location of another pixel $(i,j)$, this ray produces a scatter contribution that is approximately described by the expression $K_{M,r(T(k,l)),\Phi(k,l)}(i-k, j-l)$, where for the utilized kernel the shift radius r is specified by the water thickness at pixel $(k,l)$, and the shift angle $\Phi(k,l)$ might be chosen as the polar angle of pixel $(k,l)$ in a coordinate system with origin at the "centre of attenuation mass" $(c_1,c_2)$ specified as $$\begin{pmatrix} c_1 \\ c_2 \end{pmatrix} = \frac{1}{\sum_{k,l} T(k, l)} \cdot \sum_{k,l} T(k, l) \cdot \begin{pmatrix} k \\ l \end{pmatrix}.$$

The total scatter at pixel $(i,j)$ may then be obtained by summing up the contributions of all rays $(k,l)$, yielding $$S^0(i, j) = w \cdot \sum_{k,j} K_{M,r(T(k,l)),\Phi(k,l)}(i-k, j-l),$$

where the sum runs over all pixel $(k,l)$ of the detector, and w denotes the pixel area.

According to another exemplary embodiment of the method for error compensation a spherical model is used for the calculation of the kernels, wherein the total scatter at the given pixel is defined by:

$$S^0(i,j) = w \cdot \sum_{k,j} K_{R(T(k,l),g(k,l)),r(T(k,l)g(k,l)),\Phi(k,l)}(i-k, j-l),$$

wherein $S^0(i,j)$ is the total scatter at pixel (i,j), w denotes the area of the pixel, and $K_{R(T(k,l),g(k,l)),r(T(k,l)g(k,l)),\Phi(k,l)}(i-k, j-l)$ is the kernel indicative for the scattering introduced from a ray impinging at pixel (k,l) at the location of pixel (i,j) and depending on: R, which represents a radius of the spherical geometric model, g, which represents a gradient of the corresponding image of water-equivalent thickness T, and (r,Φ), which represents a positional shift of the ellipsoidal geometric model with respect to a centre of the pixel array.

According to another exemplary embodiment the method for error compensation method the parameters R and r are chosen according $$R = \frac{T}{4} \cdot \sqrt{4+g^2} \text{ and } r = \frac{T}{4} \cdot g$$

and Φ=arg(grad T), with T=a water-equivalent thickness of the physical object, and g=|grad T|.

According to this exemplary embodiment a spherical geometric model may be used, which may have a significant advantage in that it does not require estimation of global model parameters for each projection, but is based on local estimation of such parameters for each single ray. This variant uses spherical geometric models (phantoms) and, as the previously described variant, also works via phantom offsets with respect to the pencil beam.

Applied to a projection P, the method first may require to calculate the gradient of the corresponding image of water-equivalent thickness T=-(ln P)/μ, which for each detector element exhibits a certain value of magnitude g=|grad T| and direction Φ=arg(grad T). To estimate the scatter contribution of a given source ray, the local values of water-equivalent thickness T, gradient magnitude g and direction Φ then uniquely may determine the parameters (R, r, Φ) of the utilized sphere phantom, where R may denote the radius of the sphere, and (r, Φ) may be its positional offset in the plane parallel to the detector. The mapping (T,g)⇒(R,r) is done in such a way that a parallel projection of the utilized sphere would exhibit a water-equivalent thickness T and a thickness gradient g at the position of the pencil beam. This is achieved by the following equations:

$$R = \frac{T}{4} \cdot \sqrt{4+g^2}, r = \frac{T}{4} \cdot g.$$

It should be noted that in this way, the positional offset will be close to zero in flat image areas, while it becomes close to the sphere radius at steep gradients, e.g. near the object border. Using this method, for a given system geometry and beam quality, the convolution kernels are pre-calculated depending on the three parameters (R, r, Φ) as compared to four parameters in case of the method based on ellipsoid models (kernels).

Such a spherical model may be in particular efficient when the projection image is affected by truncations, e.g. in case the physical object is larger than the possible imaged object. While the ellipsoidal model may be affected by an erroneous estimation of the model parameter $r_1=r_2$ due to this truncations, the method based on sphere kernels may be not affected by truncations, due to its localized estimation of model parameters.

According to another exemplary embodiment the method further comprises calculating a first error compensated image in a multiplicative way by using the total scatter. Preferably, the multiplicative correction is performed according:

$$P^{(n+1)} = \frac{P^{(0)} \cdot P^{(n)}}{P^{(n)} + S^{(n)}},$$

wherein $S^{(n)}$ denotes the scatter image estimated from the projection image $P^{(n)}$.

The multiplicative way may in particular be advantageous, since it may exhibit an increased stability of convergence and may have the additional advantage that negative projection values are avoided. Using the latter correction scheme, assuming the same estimated scatter, in regions with high attenuation a smaller amount of scatter may be corrected for as compared to regions with low attenuation. In contrast to subtractive correction where a pre-defined threshold on the maximal subtracted amount of scatter may be specified in order to avoid negative projection values, such effects may be automatically avoided using multiplicative correction. In contrast to subtractive correction, multiplicative correction may need to be performed on full resolution projection images and therefore, in each iteration the estimated coarse scatter distributions may be again at least partly upsampled before applying the correction step.

According to another exemplary embodiment the method further comprises calculating a first error compensated image in a subtractive way by using the total scatter. Preferably, the subtractive correction is performed according: $P^{(n+1)}=P^{(0)}-S^{(n)}$, wherein $S^{(n)}$ denotes the scatter image estimated from the projection image $P^{(n)}$.

According to another exemplary embodiment the method further comprises calculating a second error compensated image by using the first error compensated image as the projection image. That is, the correction may be performed in an iterative way, e.g. in 4 to 5 repetitions. That is, after estimation of a scatter image $S^{(0)}(x,y)$, this image is then used to correct the originally acquired projection image $P^{(0)}(x,y)$ (containing both contributions of primary and scattered radiation), yielding an estimate $P^{(1)}(x,y)$ of the true primary image. Because the initial scatter-deteriorated projection image $P^{(0)}$ results in a somewhat falsified thickness image T, estimation and correction steps are preferably repeated a number of times in an iterative fashion, until convergence of the estimated primary image is reached (this may usually be achieved in about 4-5 iterations). Since scatter distributions are smooth, scatter estimation may be carried out using a strongly down-sampled detector pixel grid in order to decrease computational effort.

One exemplary aspect of the present invention may be seen in that a variable offset of the utilized phantoms is introduced during kernel generation. The schemes based on ellipsoid kernels and on sphere kernels make use of such an offset, and thus are potentially able to appropriately account for the asymmetry of scatter distributions produced near the object boundaries. Both estimation schemes may have high potential for application in X-ray volume imaging. Especially the scheme based on pre-calculated sphere kernels may produce accurate results for different body regions (e.g., head, thorax and pelvis regions), and its performance may not be affected by the presence of truncations. Most importantly, the optimal correction factors for these body regions may almost be the same. Regarding computational costs, the sphere method may be somewhat more demanding than the ellipsoidal methods, since the scatter kernels of all possible sphere configurations are preferably read and simultaneously stored in memory. For most efficient use of this method, this data may be kept in memory instead of repeatedly being read when the method is applied to a sequence of projections of a rotational acquisition.

In order to improve the method based on ellipsoid kernels, which my be affected by truncations when applied to the projections of thorax and pelvis, it may be possible to more robustly estimating the model parameters via an optimization algorithm using forward projection of the model, which might also be separately applicable to each acquired projection. This is due to the fact that this method relies on at least approximate estimation of two global parameters per projection, one of which is difficult to estimate in case of truncations.

Furthermore, according to one exemplary aspect of the invention two different schemes for the correction step of scatter compensation have been considered, namely subtractive and multiplicative correction. Each scheme can be combined with each of the scatter estimation algorithms according to exemplary embodiments. While subtractive correction may casually produce clipping-related streak artifacts and may suffer from unsatisfactory stability of the iterative estimation-correction procedure, it may be less computational time consuming. Alternatively, multiplicative correction may produce in all cases favourable results. Since multiplicative correction possibly needs to be performed on higher resolution projection images, in each iteration estimated coarse scatter distributions may be again up-sampled before applying the correction step.

The error compensation of a projection image of a physical object may be realized by a computer program, i.e. by software, or by using one or more special electronic optimization circuits, i.e. in hardware, or in hybrid form, i.e. by software components and hardware components. The computer program may be written in any suitable programming language, such as, for example, C++ and may be stored on a computer-readable medium, such as a CD-ROM. Also, the computer program may be available from a network, such as the WorldWideWeb, from which it may be downloaded into image processing units or processors, or any suitable computers.

It should be noted in this context, that the present invention is not limited to computed tomography, but may include the use of C-arm based 3D rotational X-ray imaging, positron emission tomography or the like. It should also be noted that this technique may in particular be useful for medical imaging of different body regions such as a head, a thorax or a pelvic region of a patient.

These and other aspects of the present invention will become apparent from and elucidated with reference to the embodiment described hereinafter. The disclosed embodiments and aspects described anywhere in this application may be mixed and/or combined with each other.

An exemplary embodiment of the present invention will be described in the following, with reference to the following drawings.

Figure 8:
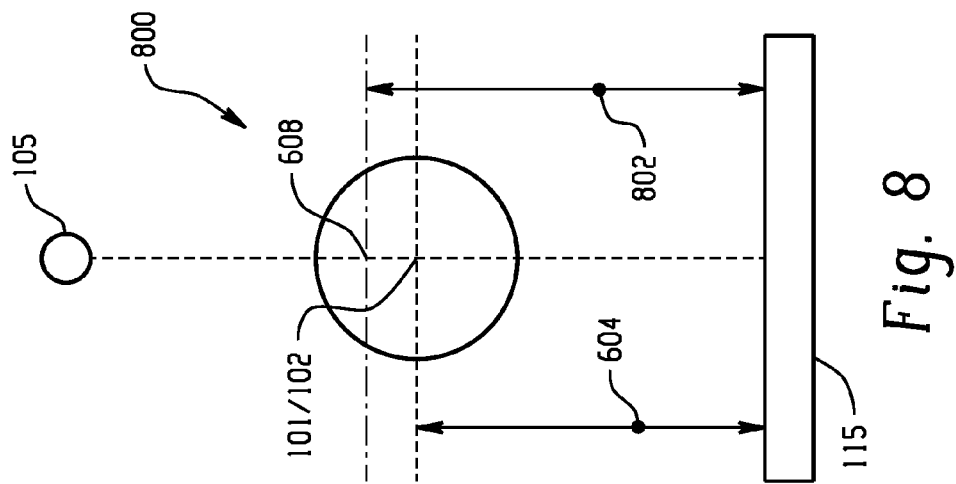
Figure 7:
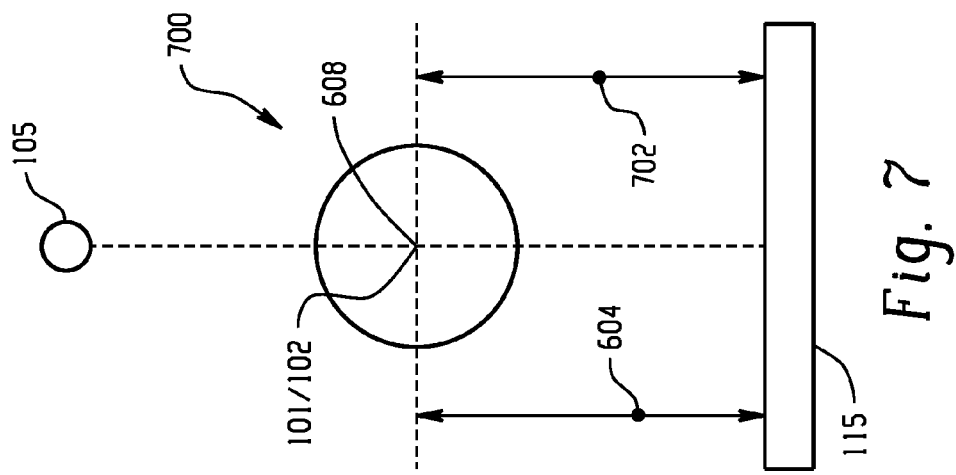
Figure 6:
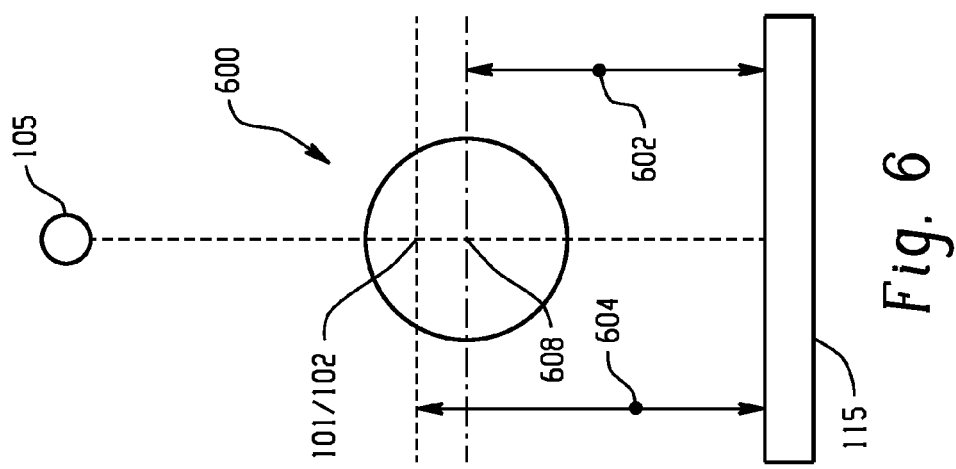

FIGS. 6, 7, and 8 show various off-centered and centered spherical models.

FIG. 9 shows an example of determining an imaged object to detector distance based on a center of a portion of a ray traversing the object.

FIG. 10 shows an example spherical model based on the distance of FIG. 9.

FIG. 11 shows an example of determining an imaged object to detector distance corresponding to an exit region of a ray traversing the object.

FIG. 12 shows an example spherical model based on the distance of FIG. 11.

Figure 13:
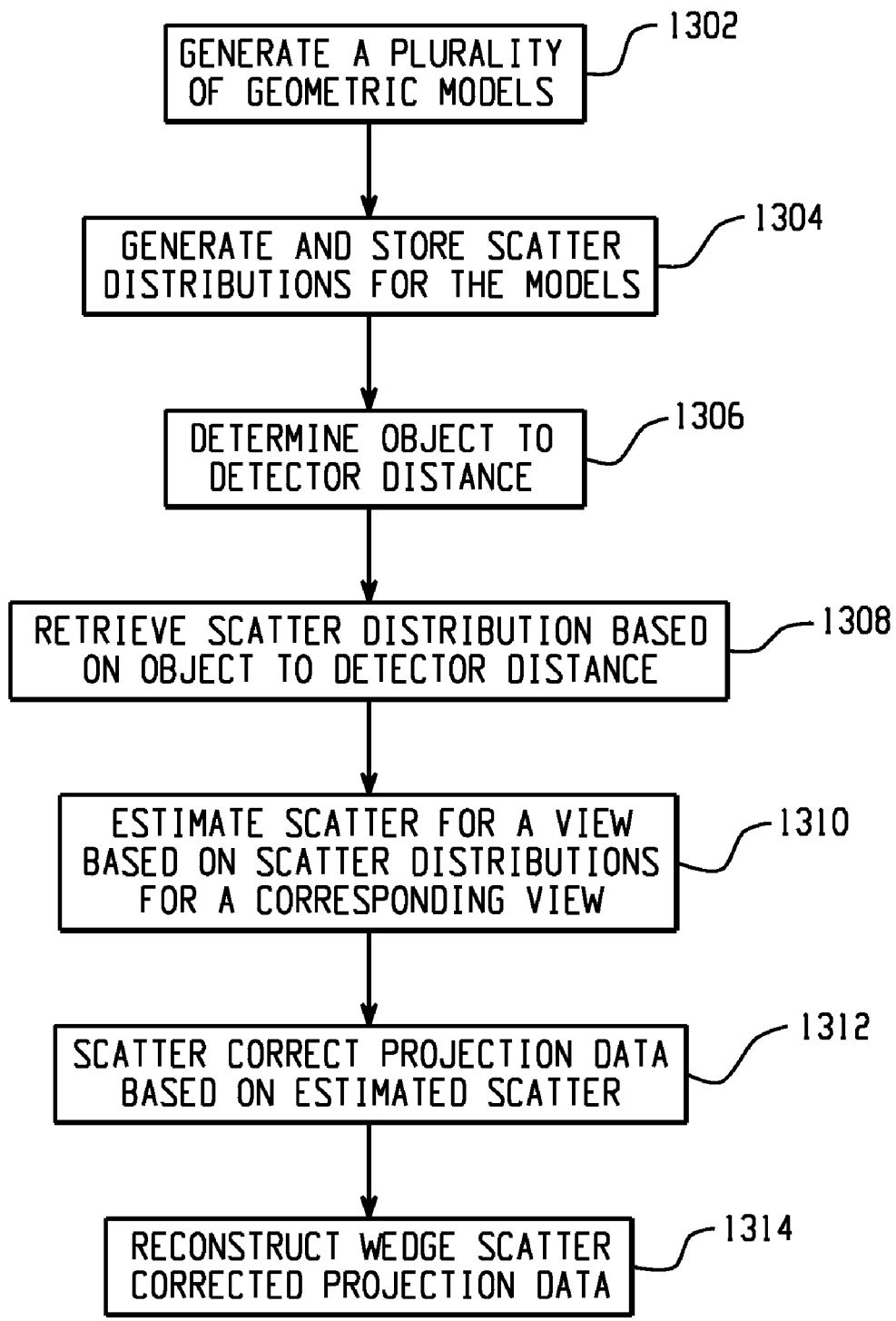

FIG. 13 shows an example method for generating off-centered and centered spherical models.

Figure 14:
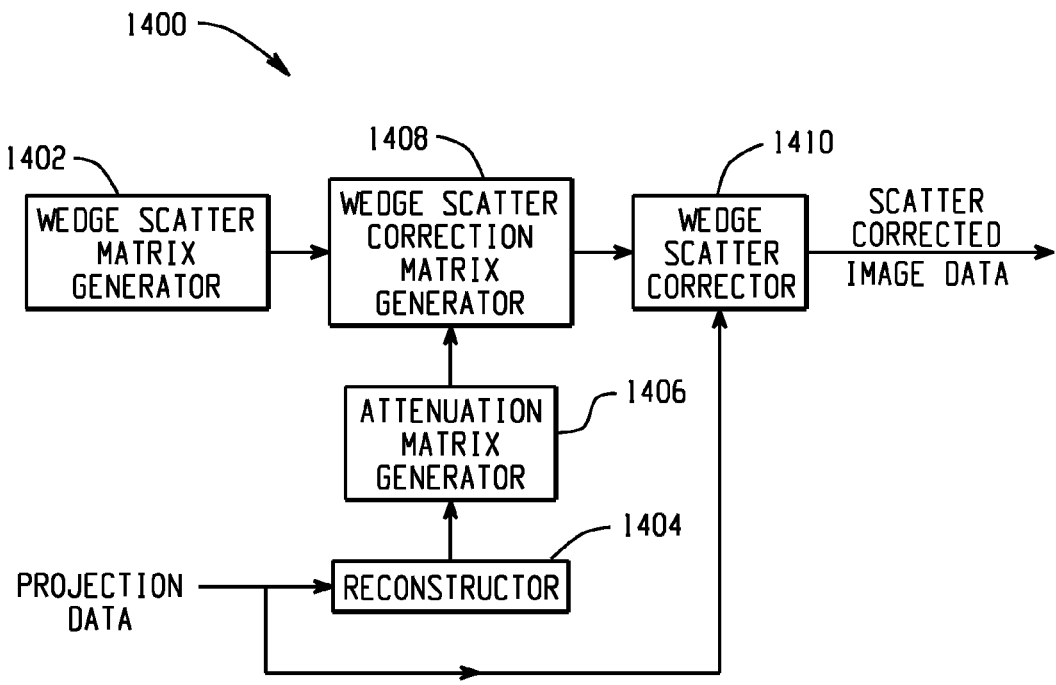

FIG. 14 shows a system for generating a 4(D) wedge scatter correction matrix.

Figure 15:
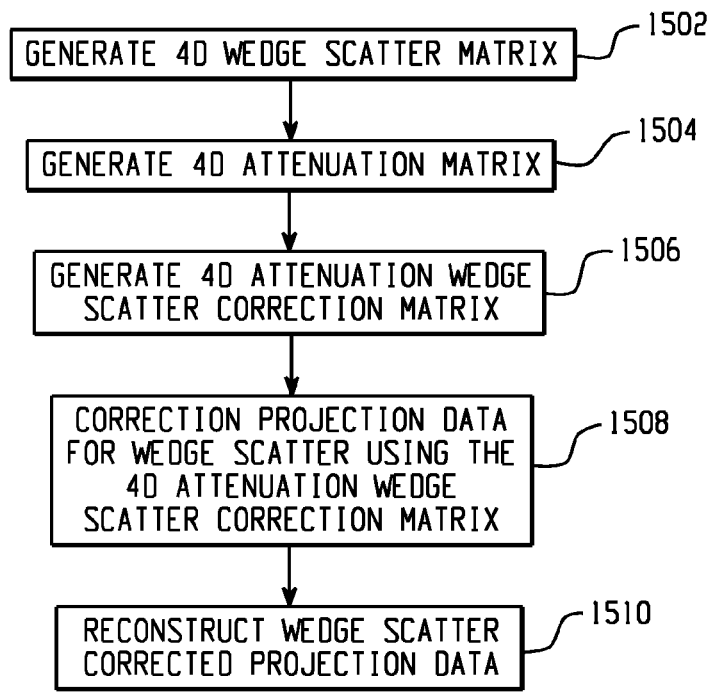

FIG. 15 shows an example method for generating a 4(D) wedge scatter correction matrix.

The illustration in the drawings is schematically. In different drawings, similar or identical elements are provided with the similar or identical reference signs.

Figure 1:
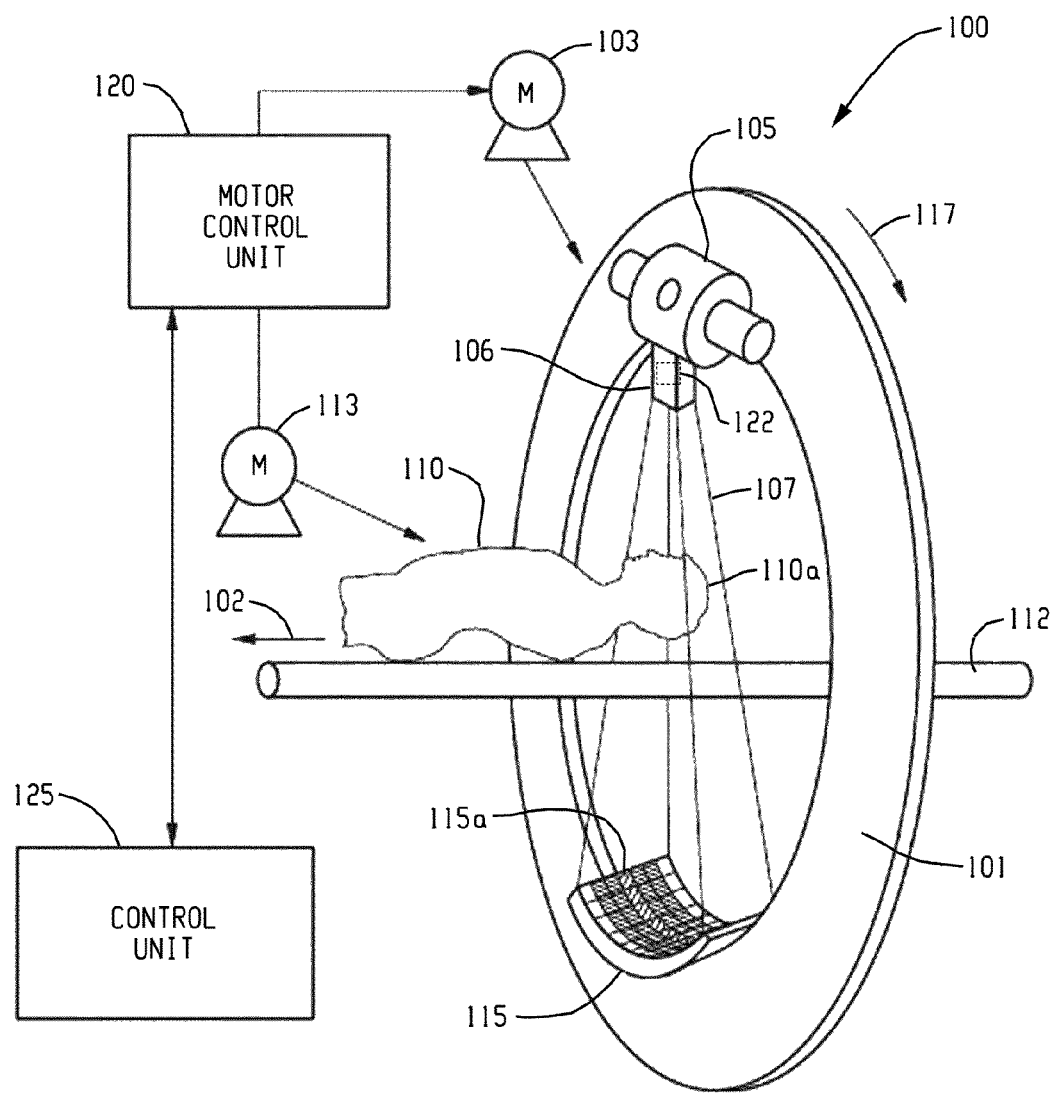
FIG. 1 shows a simplified schematic representation of a computed tomography system.

FIG. 1 shows an exemplary embodiment of a computed tomography scanner system which projection data may be handled by a correction method according an embodiment of the invention.

The computed tomography apparatus 100 depicted in FIG. 1 is a cone-beam CT scanner. The CT scanner depicted in FIG. 1 comprises a gantry 101, which is rotatable around a rotational axis 102. The gantry 101 is driven by means of a motor 103. Reference numeral 105 designates a source of radiation such as an X-ray source, which emits polychromatic or monochromatic radiation.

Reference numeral 106 designates an aperture system which forms the radiation beam emitted from the radiation source unit to a cone-shaped radiation beam 107. The cone-beam 107 is directed such that it penetrates an object of interest 110 arranged in the center of the gantry 101, i.e. in an examination region of the CT scanner, and impinges onto the detector 115 (detection unit). As may be taken from FIG. 1, the detector 115 is arranged on the gantry 101 opposite to the radiation source unit 105, such that the surface of the detector 115 is covered by the cone beam 107. The detector 115 depicted in FIG. 1 comprises a plurality of detection elements 115a each capable of detecting X-rays which have been scattered by, attenuated by or passed through the object of interest 110. The detector 115 schematically shown in FIG. 1 is a two-dimensional detector, i.e. the individual detector elements are arranged in a plane, such detectors are used in so-called cone-beam tomography.

During scanning the object of interest 110, the radiation source unit 105, the aperture system 106 and the detector 115 are rotated along the gantry 101 in the direction indicated by an arrow 117. For rotation of the gantry 101 with the radiation source unit 105, the aperture system 106 and the detector 115, and the motor 103 are connected to a motor control unit 120, which is connected to a control unit 125 (which might also be denoted and used as a calculation, reconstruction or determination unit).

In FIG. 1, the object of interest 110 is a human being which is disposed on an operation table 112. During the scan of a head 110a, a thorax or any other part of the human being 110, while the gantry 101 rotates around the human being 110, the operation table 112 may displace the human being 110 along a direction parallel to the rotational axis 102 of the gantry 101.

This may be done using a motor 113. By this, the head is scanned along a helical scan path. The operation table 112 may also be stopped during the scans to thereby measure signal slices.

The detector 115 is connected to the control unit 125. The control unit 125 receives the detection result, i.e. the read-outs from the detection elements 115a of the detector 115 and determines a scanning result on the basis of these read-outs. Furthermore, the control unit 125 communicates with the motor control unit 120 in order to coordinate the movement of the gantry 101 with motors 103 and 113 with the operation table 112.

The control unit 125 may be adapted for reconstructing an image from read-outs of the detector 115. A reconstructed image generated by the control unit 125 may be output to a display (not shown in FIG. 1) via an interface.

The control unit 125 may be realized by a data processor or computer to process read-outs from the detector elements 115a of the detector 115.

The computed tomography apparatus shown in FIG. 1 may capture computed tomography data of the head or thorax of a patient. In other words, when the gantry 101 rotates and when the operation table 112 is shifted linearly, then a helical scan is performed by the X-ray source 105 and the detector 115 with respect to the patient. After having acquired these data, the data are transferred to the control unit 125, and the measured data may be analyzed retrospectively.

Figure 2:
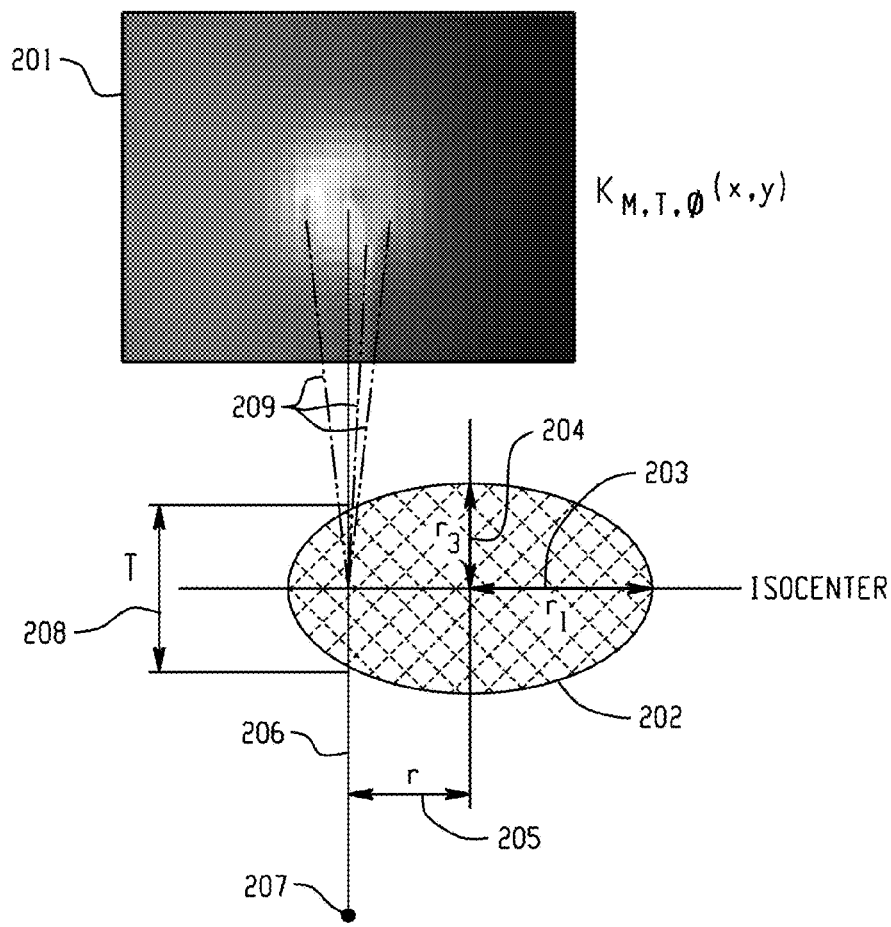
FIG. 2 shows a schematic sketch of a geometry for generation of an ellipsoidal kernel.

FIG. 2 shows a schematic sketch of a geometry for generation of an ellipsoidal kernel. By referring to this sketch an exemplary embodiment of ellipsoid kernels with variable offsets will be described. This method accounts for the fact that the scatter contribution originating from regions near the borders of the imaged object is highly asymmetric (e.g. object centre versus border region), while in known methods no offset between scattering ray and model is used, and therefore the asymmetry of the produced scatter contribution is generally not accurately accounted for.

According to the ellipsoidal model the projection image P(x,y) is first normalized and then converted into an equivalent image of water-equivalent thickness T(x,y) according to the formula $T=-(\ln P)/\mu$, where $\mu$ denotes the approximate attenuation value of water.

Afterwards, two scalars are extracted from the image of water-equivalent thickness T, specifying parameters of an ellipsoid-shaped model of the imaged object with water-like attenuation and scattering characteristics. In particular, the homogeneous ellipsoid is assumed to have half axes $r_1=r_2=\text{sqrt}(A/\pi)$ in the plane parallel to the detector surface, and a half axis $r_3=T_{max}/2$ perpendicular to the detector. Here, A is a measure of the cross-sectional area of the imaged object parallel to the detector surface and is specified as the area of the object shadow (defined as the region in the projection with water-equivalent thickness above a certain threshold, e.g. 10 mm) divided by the square of the system's geometric magnification factor. The quantity $T_{max}$ is the approximate measure of largest water-equivalent thickness. For calculation of scatter kernels accounting for the important dependence on the pixel position, known water slabs were replaced by the ellipsoid model, and additionally positional offsets of the model with respect to the simulated pencil beam were considered. For each combination of model parameters $M=(r_1, r_2, r_3)$, scatter kernels $K_{M,r,\Phi}(x,y)$ were generated under variation of the relative position between pencil beam and ellipsoid model in the plane parallel to the detector, wherein the positional shift of the model ellipsoid with respect to the pencil beam is denoted by the polar coordinates $(r, \Phi)$. It should be noted in this context that for a given model M, different shift values are equivalent to different values of the water-equivalent thickness at the pencil beam position, ranging from the maximal thickness of the model at zero shift down to almost zero thickness at shifts almost equal to the spatial extent of the model. In turn, for a fixed shift angle f, a given value of water thickness T in the considered range unambiguously determines a corresponding value of r, so that in the interval (0, $T_{max}$], r(T) is a unique function. The geometry used for generation of ellipsoid kernels is illustrated in FIG. 2.

FIG. 2 shows a flat detector 201 comprising columns x and rows y. On the detector the detected scatter distribution of a ray penetrating an ellipsoid model is schematically depicted by the white field on the flat detector 201. It can be seen that the detected scatter is highly asymmetric, i.e. the effect of scattering is much higher on the left half of the flat detector 201 than on the right half of the flat detector 201, leading to brighter pixels left from the centre. Further, FIG. 2 shows in a schematically shape the water ellipsoid 202 used to generate the ellipsoid kernels $K_{M,r,\Phi}(x,y)$. The ellipsoid 202 is characterized by several parameters, in particular the half axes $r_1$ 203, $r_3$ 204, while $r_2$ is not depicted in FIG. 2 since it extends perpendicular to the plane shown in FIG. 2. Furthermore a nonzero positional shift r 205 is marked in FIG. 2, i.e. a nonzero shift of the focal line 206, which extends from the focal spot 207 to the centre of the flat detector 201, and the centre of the water ellipsoid 202. As $r_2$ the shift angle $\Phi$ is not shown in FIG. 2, since it is defined in a plane parallel to the detector surface. The water thickness T is depicted as 208 in FIG. 2, while lines 209 schematically show different scattered rays.

Using the model- and position-dependent kernels $K_{M,r,\Phi}(x,y)$, the scatter contribution of a ray impinging on the detector pixel with indices (k,l) at the location of another pixel (i,j) is given by the expression $K_{M,r(T(k,l)),\Phi(k,l)}(i-k, j-l)$, where the length r of the positional shift for the utilized kernel is specified via the water thickness at pixel (k,l), and the shift angle $\Phi(k,l)$ is chosen as the polar angle of pixel (k,l) in a coordinate system with origin at the "centre of attenuation mass" $(c_1,c_2)$ specified as $$\begin{pmatrix} c_1 \\ c_2 \end{pmatrix} = \frac{1}{\sum_{k,l} T(k,l)} \cdot \sum_{k,l} T(k,l) \cdot \begin{pmatrix} k \\ l \end{pmatrix}.$$

This may provide a suitable orientation of the asymmetric scatter kernel distributions in case a single, approximately ellipsoid-shaped object. The total scatter at pixel (i,j) is then obtainable by summing up the contributions of all rays (k,l) yielding the expression $$S^0(i,j) = w \cdot \sum_{k,j} K_{M,r(T(k,l)),\Phi(k,l)}(i-k, j-l).$$

The geometry for sphere kernel generation is the same as the one depicted in FIG. 2, except that $r_1=r_2=r_3=R$, i.e. instead of a water ellipsoid a water sphere is used. However, the offset may be calculated differently.

Figure 3:
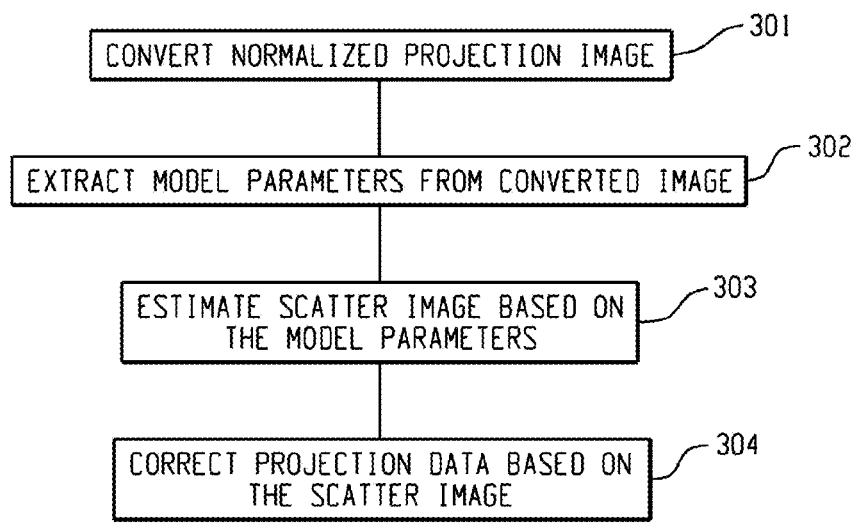
FIG. 3 shows a schematic flow chart of an error compensation method according to an exemplary embodiment of the invention.

FIG. 3 shows a schematic flow chart of an error compensation method according to an exemplary embodiment of the invention. This embodiment in particular relates to an ellipsoidal geometric model. The method processes each acquired projection image separately and may comprise the following sequence:

1. An acquired normalized projection image $P^{(0)}(x,y) = P(x,y)+S(x,y)$ comprised of a primary portion P and a scattered portion S is converted into an image of water-equivalent thickness T according to $T=-(\ln P^{(0)}(x,y))/\mu$, where $\mu$ denoted the appropriate attenuation value of water (Step 301).

2. From the image T, a number of scalar parameters are extracted, specifying the parameters of a simple geometric model of the imaged object. For instance, the half axes $r_i$ of a homogeneous ellipsoidal object model with circular cross-section parallel to the detector plane and water-like attenuation may be calculated according to, e.g. $r_1=r_2=\text{sqrt}(A/\pi)$ and $r_3=B$, with scalars A and B. In this particular embodiment, i.e. the ellipsoid case, A is an approximate measure of the maximum cross-sectional area of the imaged object parallel to the detector surface, and B is an appropriate measure of the maximum water-equivalent thickness of the imaged object. A may be specified as the area of the object shadow, e.g. the region in the projection with attenuation above a certain threshold, divided by the square of the system's geometric magnification factor. To minimize the influence of localized strong attenuation variations, B may be specified as the maximum of T(x,y) after low-pass filtering or as a percentile from a histogram of T. In an alternative embodiment, the model parameters are determined from a least square fit of a forward projection of the model to the acquired projection (Step 302).

3. An estimation of the scattered image $S^{(0)}(x,y)$ is obtained by summing up pre-calculated scatter contributions for the rays impinging on the individual detector pixels. For this purpose, normalized scatter distributions K(x,y) are off-line generated using pencil-beam Monte-Carlo scatter simulations of the parametric object model, taking into account the correct system geometry, beam spectrum, and anti-scatter grid parameters. For a given system configuration, separate kernels $K_{M,r,\Phi}(x,y)$ are off-line generated as a function of model parameters M and, to account for the important dependence on pixel position relative to the projected object centre, as a function of a positional shift $(r,\Phi)$ of the model with respect to the pencil beam, wherein $(r,\Phi)$ are polar coordinates denoting the shift in the plane parallel to the detector. It is important to note that for a given model M, different shift values are equivalent to different values of the water-equivalent thickness at the pencil beam position, ranging from the maximal thickness of the model at zero shift down to almost zero thickness at shifts almost equal to the spatial extent of the model. In turn, for simple geometric models and a fixed shift angle $\Phi$, a given value of water thickness T in the considered range unambiguously determines a corresponding value of r, so that in the interval $(0,T_{max}]$, r(T) can be assumed to be a unique function.

Now, the scatter contribution of a ray impinging on the detector pixel with indices (k,l) can be considered. At the location of another pixel (i,j), this ray produces a scatter contribution that is approximately described by the expression $K_{M,r(T(k,l)),\Phi(k,l)}(i-k, j-l)$, where for the utilized kernel the shift radius r is specified by the water thickness at pixel (k,l), and the shift angle $\Phi(k,l)$ might be chosen as the polar angle of pixel (k,l) in a coordinate system with origin at the "centre of attenuation mass" $(c_1,c_2)$ specified as $$\begin{pmatrix} c_1 \\ c_2 \end{pmatrix} = \frac{1}{\sum_{k,l} T(k,l)} \cdot \sum_{k,l} T(k,l) \cdot \begin{pmatrix} k \\ l \end{pmatrix}.$$

The total scatter at pixel (i,j) is then obtained by summing up the contributions of all rays (k,l), yielding $$S^0(i,j) = w \cdot \sum_{k,j} K_{M,r(T(k,l)),\Phi(k,l)}(i-k, j-l),$$

where the sum runs over all pixel (k,l) of the detector, and w denotes the pixel area (Step 303).

4. Using the estimated scatter $S^0(x,y)$, the acquired projection image $P^{(0)}(x,y)$ is then corrected, yielding an estimate $P^{(1)}(x,y)$ of the true primary image (Step 304). Because the initial scatter-deteriorated projection image $P^{(0)}$ results in a somewhat falsified thickness image T, best results are achieved when 1. to 4. (Steps 301 to 304) are repeated about four times in an iterative fashion until convergence of the estimated primary image is reached, wherein the repetition of 2. (Step 302) is optional. Since scatter distributions are smooth, the above steps may be carried out using a strongly down-sampled detector pixel grid in order to decrease computational effort.

Correction may either be performed in a subtractive or in a multiplicative way. Subtractive corrections in iteration n ($n \geq 1$) is carried out according to the formula $P^{(n+1)}=P^{(0)}-S^{(n)}$. However, multiplicative correction according $$P^{(n+1)} = \frac{P^{(0)} \cdot P^{(n)}}{P^{(n)} + S^{(n)}}$$

was found to increase stability of convergence and has the additional advantage that negative projection values are avoided.

FIG. 4 shows some exemplary scatter images. In the upper figures of FIG. 2 results of a error correction method according to an exemplary embodiment of the present invention are shown in particular an ellipsoid model, whereas the lower figures of FIG. 2 show results of a known method based on pre-calculated scatter kernels, which does not use a positional offset of the model and thus does not accurately account for the asymmetric scatter contributions especially of the rays near the object borders. In detail, FIG. 4*a* shows in the upper part an estimated scatter image depicted for a two-dimensional detector having rows y and columns x. In the lower part of FIG. 4*a* the corresponding profile along the central horizontal cross-section through the image is displayed. FIG. 4*b* shows in the upper part the estimated scatter image depicted for a two-dimensional detector having rows y and columns x. In the lower part of FIG. 4*b* the corresponding profile along the central horizontal cross-section through the image is displayed.

Figure 4A:
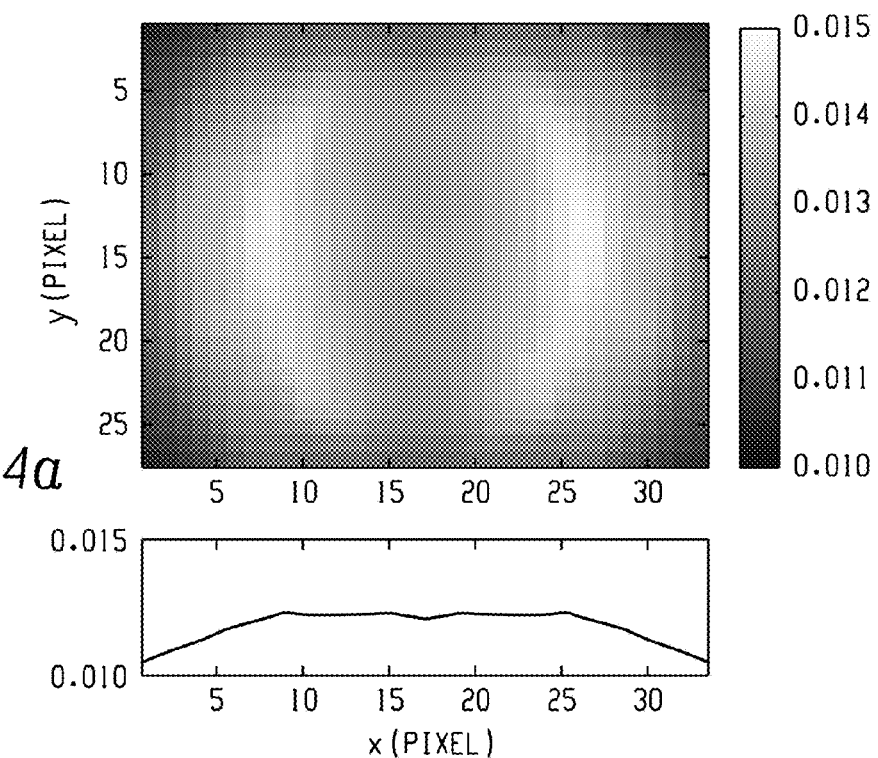
FIGS. 4a-4f show some exemplary scatter images.
Figure 4B:
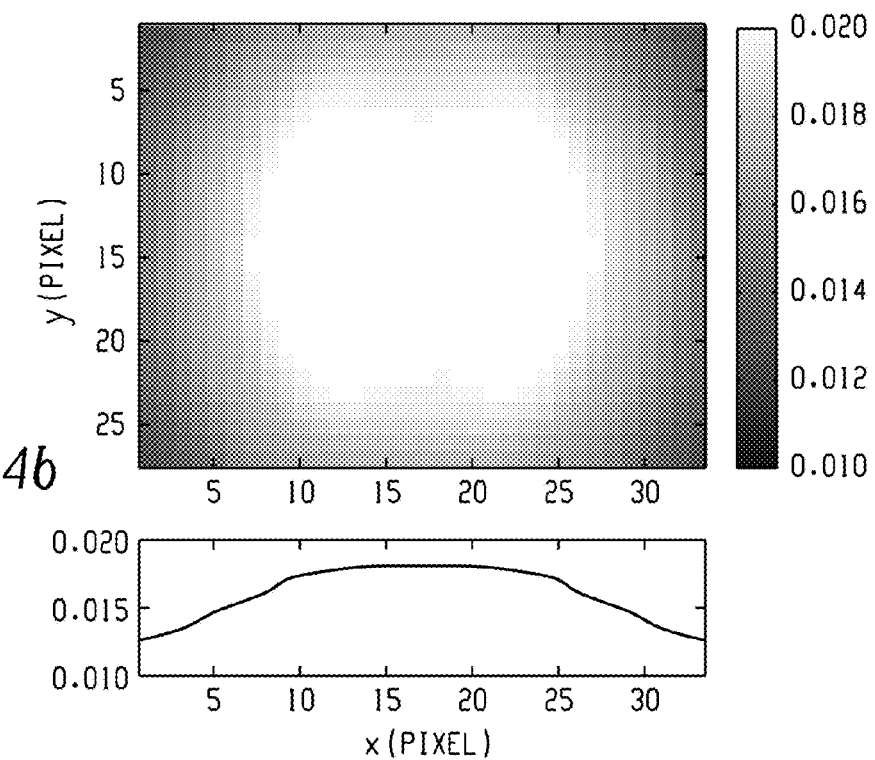
Figure 4C:
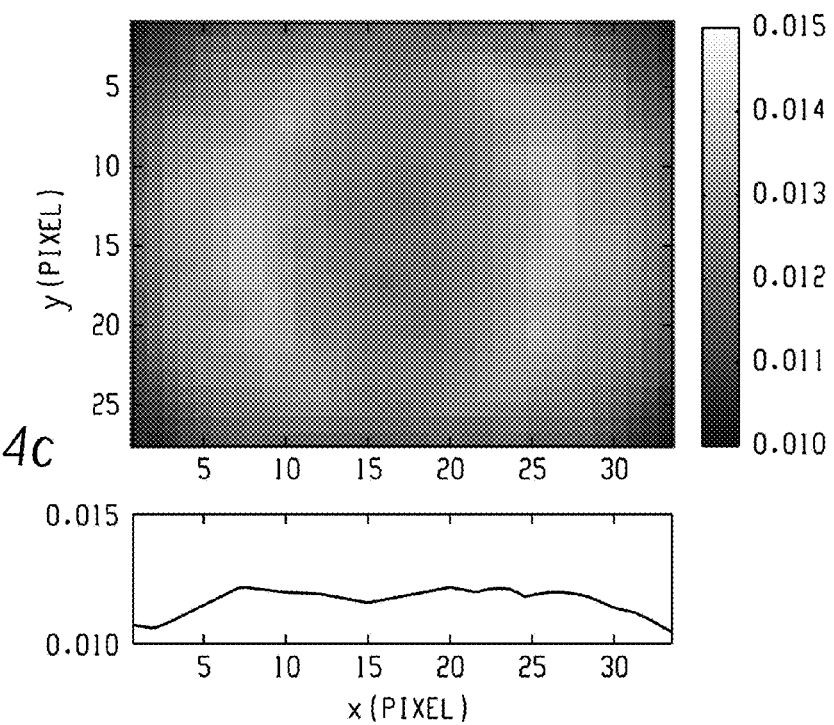
Figure 4D:
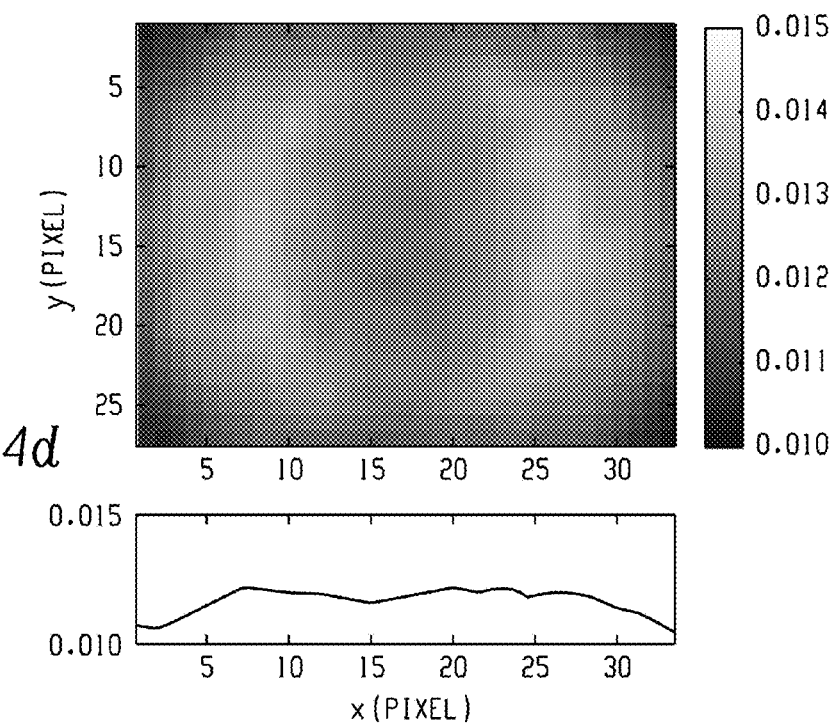

FIG. 4*c* shows in the upper part a simulated ground truth depicted for a two-dimensional detector having rows y and columns x. In the lower part of FIG. 4*c* the corresponding profile along the central horizontal cross-section through the image is displayed. FIG. 4*d* depicts the same for the known method. FIGS. 4*c* and 4*d* are the same since the same ground truth is used for the comparison.

Figure 4E:
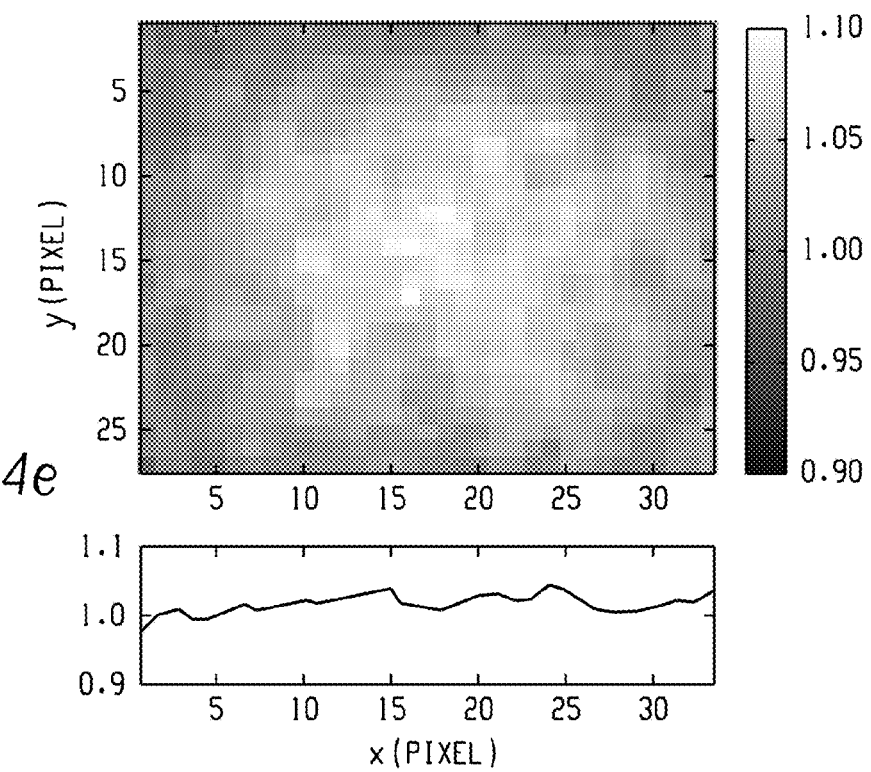
Figure 4F:
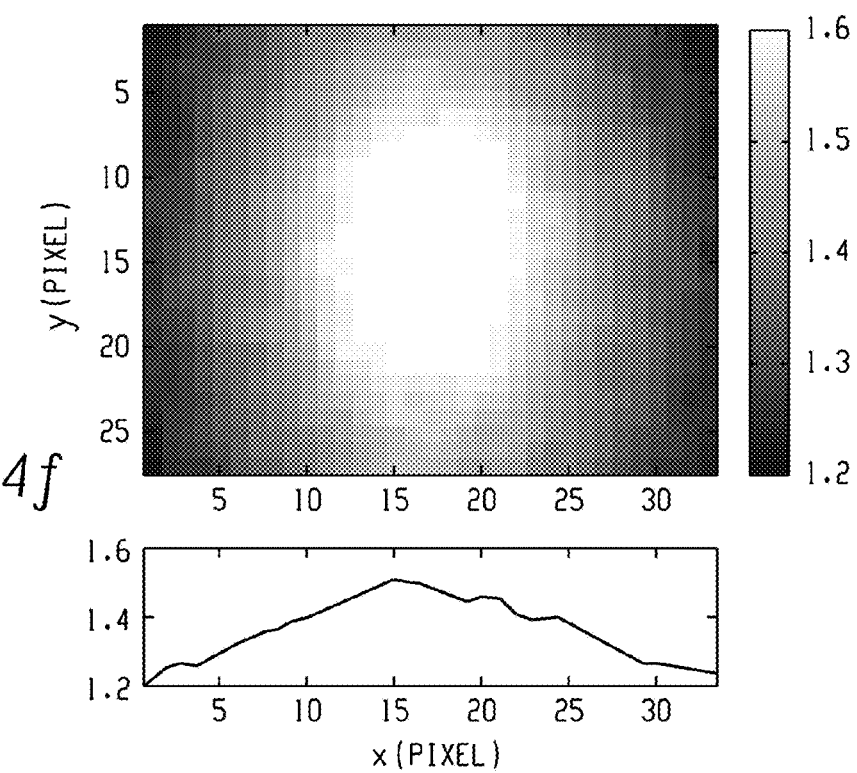

FIG. 4*e* shows in the upper part the ration of estimated image to ground truth in a two-dimensional plot having rows y and columns x. It can be clearly seen that the mean ratio is about 1 but still showing a slightly overestimation of about 5% while the scatter shape is well approximated, which can be seen from the relatively uniform distribution of the grey-scale values. On contrary, FIG. 4f shows a highly non-uniform distribution. In particularin the image centre, corresponding to the area of greatest thickness of the object, the scattering is highly overestimated, while the overestimation is much lower near the borders. In mean the overestimation is about 44%.

In the test implementation, the computational effort of the correction method according to an exemplary embodiment of the invention was only about twice as high than for the known convolution-based approaches, the results of which are depicted in the lower part of FIG. 4. In general the correction method according to an exemplary embodiment of the invention may allow for potentially much more accurate estimation of the scatter distribution, due to the fact that the dependence of scattering on further parameters than only the water-equivalent thickness is accounted for.

Figure 5:
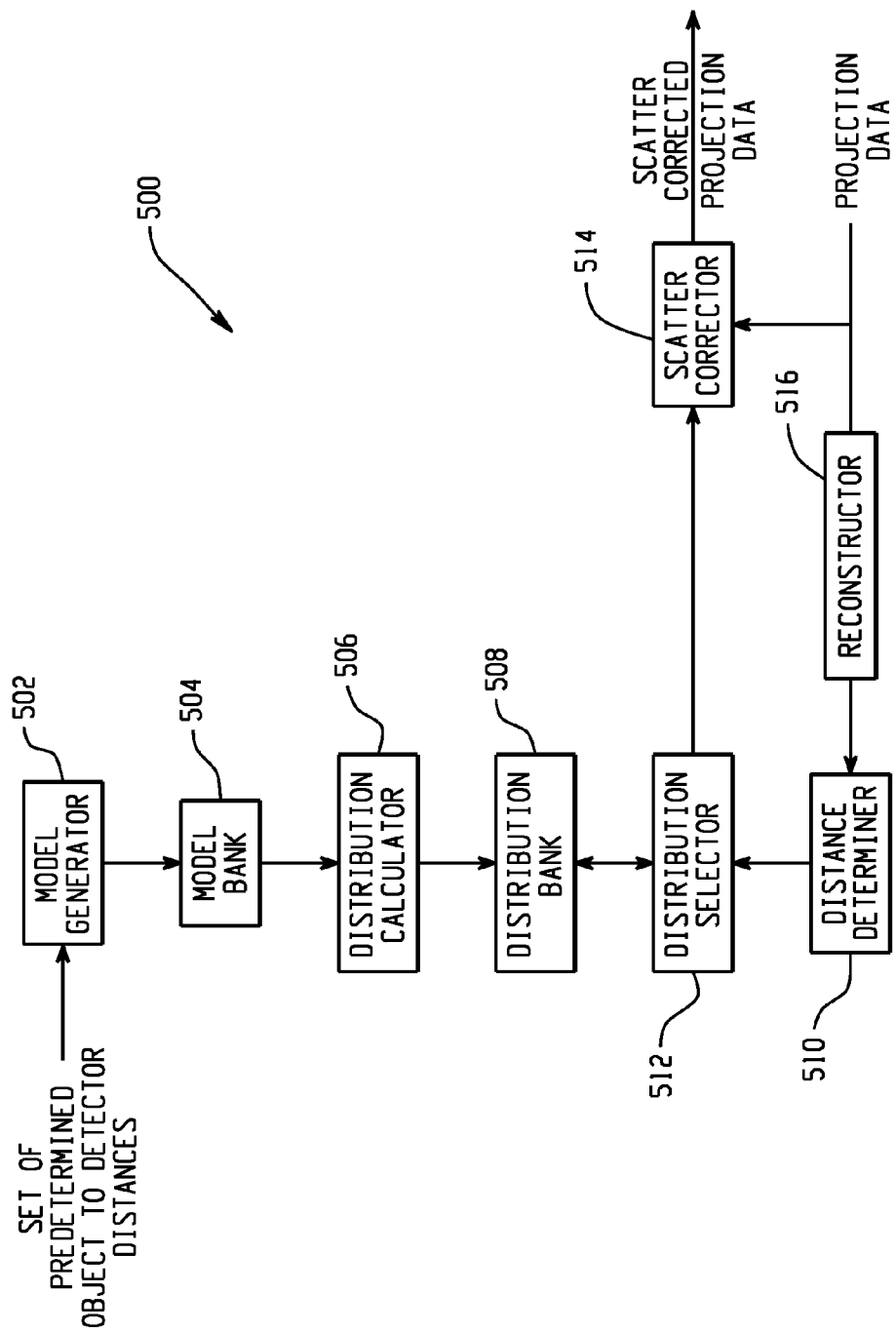
FIG. 5 shows a system for generating off-centered and centered spherical models.

As described above, scatter kernels (scatter distributions) can be generated based on various geometric models such as a spherical, an ellipsoidal and/or other model. FIG. 5 depicts a non-limiting system 500 that employs geometric models that take into account the location (e.g., off-centered and centered) of an imaged object relative to a center of rotation (the rotational axis 102 and the center of the gantry 101 (FIG. 1)).

The system 500 includes a model generator 502 that generates models based on a predetermined set of model object to detector distances. FIGS. 6, 7, and 8 show example spherical models 600, 700, and 800 in which the model object to detector distance is a distance from the model object center 608 to the detector 115, or model object center distance 602, 702, and 802. Note that the detector 115 is shown flat (instead of curved as in FIG. 1) for explanatory purposes. The source 105 (FIG. 1) is also shown.

In FIG. 6, the model object center to detector distance 602 is less than a rotation axis to detector distance 604. In FIG. 7, the model object center to detector distance 702 is substantially equal to the rotation axis to detector distance 604. In FIG. 8, the model object center to detector distance 802 is larger than the rotation axis to detector distance 604. A distance between a region where a ray exits the models 600, 700, and 800 and the detector 115 may additionally or alternatively be determined.

Returning to FIG. 5, a model bank 504 stores generated models. The model bank 504 may include memory, remote or local (as shown) to the system 500. A distribution calculator 506 generates one or more scatter distributions for the models in the model bank 504. The scatter distributions are generated as described herein at least in connection with FIGS. 2-4f or otherwise.

A distribution bank 508 stores generated distributions. A mapping or other association between a scatter distribution and the corresponding geometric model (or model object to detector distance 602, 702 or 802) may also be stored in the distribution bank 508. Likewise, the distribution bank 508 may include memory, remote or local (as shown) to the system 500.

A distance determiner 510 determines a distance between the imaged object 110 (FIG. 1) and the detector 115. In one instance, the distance determiner 510 determines the distance based on an intermediate reconstruction of the imaged object. A reconstructor 516 reconstructs the intermediate image. In this instance, for all or a subset of rays between the source 105 and the individual pixels of the detector 115, the distance between the imaged object and the detector 115 is determined. This may provide individual distances for each ray in each view.

In another instance, the distance determiner 510 determines a "center of gravity" of the imaged object and determines a shift of the center of gravity from the center of rotation 101/102. The shift can be determined in a global form from an intermediate reconstructed image or for each view separately, where the imaged object position can be approximated from a center of gravity in a projection acquired from a direction perpendicular to that of the currently considered projection.

FIG. 9 illustrates one approach for determining a distance 902 between an imaged object and the detector 115 for a ray 904 based on an intermediate reconstructed image 906. For reference, a central ray 908 traverses a path 910 from the source 105 to a central region 912 of the detector 115 and the ray 904 traverses a path 914, which is at an angle α 916 from the central ray 908.

With reference to FIGS. 5 and 9, the distance determiner 510 determines a length 918 of the portion of the ray 904 passing through the imaged object in the reconstructed image 906. The distance determiner 510 then determines the distance 902 based on a distance between a center region or midpoint 920 of the length 918 to the detector 115. FIG. 9 also shows a distance 922 between the center of rotation 101/102 and the center region 912 of the detector 115 and a distance 924 between the center of rotation 101/102 and the source 105.

With reference to FIG. 5, a distribution selector 512 selects a scatter distribution from the distribution bank 508 based on the distance 902 between the imaged object and the detector 115. In instances in which the distributions correspond to multiple model types (e.g., spherical, ellipsoidal, etc.), the distribution selector 512 may also select the distribution based on model type, which may be automatically determined (e.g., default, optimal, etc.) or determined by a user.

With reference to FIGS. 9 and 10, a suitable sphere model 1002 for the ray 904 is illustrated. Note that the spherical model 1002 is shifted away from the detector 115 relative to the center of rotation 101/102. This accounts for the midpoint 920 of the portion of the ray 904 passing through the reconstructed image 906 being off-centered with respect to the center of rotation 101/102. Also note that the spherical model 1002 is aligned with the ray 904 so that the portion of the ray 904 passing through the spherical model 1002 passes through a length that would result in the same or substantially the same attenuation as the ray 904 passing through imaged object.

Returning to FIGS. 5 and 9, if a matching scatter distribution is not in the distribution bank 508, the distribution selector 512 or another component derives a scatter distribution. In one instance, this includes creating a scatter distribution based on one or more stored scatter distributions via interpolation (e.g., nearest neighbour, linear, polynomial, spline, etc.), extrapolation, or other approach.

A scatter corrector 514 employs generated scatter distributions for each of the individual rays to correct the projection data. As described herein, e.g., at least in connection with FIGS. 2-4f, an estimate of the total scatter in a view can be determined by summing the scatter distributions for the individual rays.

In the above example, the midpoint or center of the portion of the ray passing through the imaged object is used to determine a suitable scatter distribution. In another embodiment, an object to detector distance is used to determine a suitable scatter distribution. This is described in greater detail in connection with FIGS. 11 and 12.

With respect to FIGS. 5 and 11, the distance determiner 510 determines an edge distance 1102, or a distance from a region 1104 of the imaged object 906 where the ray 904 exits the reconstructed image 906 to the detector 115. With this approach, and as shown in FIG. 12, the spherical model 1002 is shifted away from the detector 115 from an edge region 1202, where the ray 904 exits the sphere model 1002, by the edge distance 1102.

Turning to FIG. 13, a method generating and using geometric models that take into account the location (e.g., off-centered and centered) of an imaged object relative to a center of rotation 101/102 for scatter correction is illustrated.

At 1302, a plurality of geometric models are generated. As described herein, such models are generated for a plurality of model object to detector distances such as a distance between a center of a ray passing through the imaged object to the detector, a distance between a region where a ray exits the imaged object to the detector, and/or other distances.

At 1304, scatter distributions for the models are generated and stored.

At 1306, a distance between an imaged object and the detector 115 is determined. The distance can be variously determined. In one non-limiting instance, the distance is determined from an intermediate reconstructed image and corresponds to the model object to detector distance noted in act 1302.

At 1308, a scatter distribution is retrieved based on the distance between an imaged object and the detector 115. As describe herein, this includes retrieving a scatter distribution generated based on a model with a model object to detector distance that is equal or substantially equal to the imaged object to detector distance.

At 1310, scatter distributions for individual rays are used to estimate the scatter for a corresponding view.

At 1312, the estimated scatter is used to scatter correct the projection data corresponding to the intermediate reconstructed image.

At 1314, the scatter corrected projection data is reconstructed to generate volumetric image data.

FIG. 14 illustrates a system 1400 for generating a wedge scatter correction matrix.

The system 1400 includes a wedge scatter matrix generator 1402 that generates a four-dimensional (4D) wedge scatter matrix for a two-dimensional (2D) exit surface of a wedge 122 (FIG. 1) of the system 100 (FIG. 1) for each point on the two-dimensional (2D) detector 115, with no attenuating object in the examination region. In one instance, a Monte-Carlo simulation is used to generate the four-dimensional (4D) wedge scatter matrix.

Such a simulation may take into account the geometry of system 100 a given CT device to determine a profile of X-ray scatter behind or at the exit surface of the wedge 122. Furthermore, the simulation propagates the scattered X-rays towards the surface of the detector array 115 and registers the detected radiation. The simulation may also include simulation of pre-filters, collimator, etc.

Based on these simulations, the wedge scatter matrix generator 1402 calculates a four-dimensional (4D) wedge scatter matrix that indicates an amount of scatter propagating from each point on the two-dimensional (2D) exit surface of the wedge 122 to each point on the two-dimensional (2D) detector 115.

In one embodiment, the four-dimensional (4D) wedge scatter matrix is calculated only once for a given imaging system and a given set of scan parameters (e.g., X-ray spectrum, pre-filtering, wedge type, etc.) and stored in memory on the imaging system and/or other apparatus. Of course, the four-dimensional (4D) wedge scatter matrix can be calculated more then once, for example, where the four-dimensional (4D) wedge scatter matrix is not saved, where it may be desirable to generate it more than once, etc.

A reconstructor 1404 reconstructs one or more intermediate images based on the projection data to be scatter corrected. The reconstruction can be diagnostic quality or non-diagnostic quality, with courser resolution. The projection data may or may not be pre-processed.

An attenuation matrix generator 1406 generates a four-dimensional (4D) attenuation matrix based on the one or more intermediate images. In one instance, this includes, for each viewing direction (or at least a representative subset), determining line integrals through an intermediate reconstruction for at least a combination of points on the two-dimensional (2D) wedge 122 and the detector array 115. The attenuation matrix generator 1406 can also generate an attenuation matrix based on a 3D representation of the object based on a mathematical geometrical object(s) or measured line integrals in individual 2D projections of the scanned object.

The four-dimensional (4D) matrix includes a four-dimensional matrix of X-ray attenuation line integrals. In one embodiment, a spatially adaptive resolution may be used, which may reduce the computational burden, with high sampling only for the rays crossing the reconstructed object near its borders.

A correction matrix generator 1408 generates a four-dimensional (4D) attenuated wedge scatter correction matrix (hereafter correction matrix) based on the four-dimensional (4D) wedge scatter matrix and the four-dimensional (4D) attenuation matrix. In one instance, this includes multiplying each entry in the four-dimensional (4D) wedge scatter matrix with a corresponding attenuation factor from the four-dimensional (4D) attenuation matrix. As such, the correction matrix takes into account the attenuation of the imaged object.

A wedge scatter corrector 1410 corrects the projection data for wedge scatter based on the four-dimensional wedge scatter matrix and the four-dimensional (4D) attenuation matrix. In the illustrated embodiment, the wedge scatter corrector 1410 corrects the projection data based on the correction matrix. In one instance, this includes, for each or a subset of the detector pixels, estimating detected wedge scatter behind the imaged object by summing the attenuated scatter contributions from all or a subset of all the points on the two-dimensional (2D) exit surface of the wedge 122.

This approach can be considered a second-pass wedge scatter estimation using a pre-calculated (e.g., Monte-Carlo) wedge scatter profile that is propagated through an intermediate reconstruction of the imaged object where line integrals through the imaged object are calculated for rays originating from different positions on the two-dimensional (2D) wedge surface, and the line integrals are used to attenuate the pre-calculated wedge scatter. This approach allows calculating the wedge scatter detected behind the patient with relatively high accuracy, without any relevant simplifications.

FIG. 15 illustrates a method for correcting projection data for wedge scatter.

At 1502, a four-dimensional (4D) wedge scatter matrix is generated. As noted herein, such a matrix may indicate an amount of scatter propagating from each point on a two-dimensional (2D) exit surface of the wedge of an imaging system to each point on a two-dimensional (2D) detector of the imaging system.

At 1504, a four-dimensional (4D) attenuation matrix is generated. As noted herein, such a matrix may include X-ray attenuation line integrals, for one or more viewing directions, through an intermediate reconstruction, for at least a combination of points on the two-dimensional (2D) wedge and the detector of the imaging system.

At 1506, a four-dimensional (4D) attenuated wedge scatter correction matrix is generated. As noted herein, in one instance the correction matrix is generated by multiplying each entry in the four-dimensional (4D) wedge scatter matrix with a corresponding attenuation factor from the four-dimensional (4D) attenuation matrix.

At 1508, the four-dimensional (4D) attenuated wedge scatter correction matrix is used to correct projection data for wedge scatter.

At 1510, the wedge scatter corrected projection data is reconstructed to generate volumetric image data.

It is to be appreciated that in another embodiment the estimate of patient scatter and the estimate of the wedge scatter can be individually or concurrently (e.g., in a combined form) can be used to correct for scatter, including scatter correcting each or a subset of all views prior reconstructing images.

The systems and/or methods described herein may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

What is claimed is:

1. A method for scatter correcting projection data generated by an imaging system, comprising:
   generating, via a distribution calculator, a plurality of scatter distributions based on geometric models having different object to detector distances;
   determining, via a distance determiner, an imaged object to detector distance;
   identifying, via a scatter selector, a scatter distribution of the plurality of scatter distributions having a object to detector distance that corresponds to the imaged object to detector distance; and
   employing the identified scatter distribution to scatter correct projection data corresponding to the imaged object.

2. The method of claim 1, wherein the object to detector distance corresponds to a distance between a center region of a ray passing through the imaged object and the detector.

3. The method of claim 1, wherein the object to detector distance corresponds to a distance between a region where a ray passing through the imaged object exits the imaged object and the detector.

4. The method of claim 1, wherein the object to detector distance corresponds to a center of gravity of the imaged object, and further comprising:
   determining a shift of the center of gravity of the imaged object from a center of rotation of the imaging system.

5. The method of claim 1, further comprising determining the imaged object to detector distance based on an intermediate reconstructed image of the imaged object.

6. The method of claim 1, further comprising estimating scatter for a view based on scatter distributions for at least a subset of rays in the view.

7. The method of claim 1, wherein a scatter distribution of a geometric model includes a plurality of scatter distributions, and each of the plurality of scatter distributions respectively corresponds to a contribution of an individual ray at one or more pixels other than the pixel the ray impinges.

8. A method for wedge scatter correcting projection data generated by an imaging system, comprising:
   generating, via a wedge scatter correction matrix generator, an estimate of wedge scatter by propagating a predetermined wedge scatter profile through an intermediate reconstruction of an object; and
   employing the estimate to wedge scatter correct the projection data.

9. The method of claim 8, wherein the estimate includes a four-dimensional attenuated wedge scatter correction matrix.

10. The method of claim 8, wherein the wedge scatter profile includes a scatter estimate from at least a subset of points on a two-dimensional (2D) wedge to a two-dimensional (2D) detector, with no attenuating object in an examination region between the wedge and the detector.

11. The method of claim 8, further comprising:
    generating an attenuation matrix based on the intermediate reconstruction of the object.

12. The method of any of claims 8 to 11, further comprising:
    generating an attenuation matrix based on a 3D representation of the object based on a mathematical geometrical object or measured line integrals in individual 2D projections of the scanned object.

13. The method of claim 8, further comprising:
    determining the estimate based on up to a four-dimensional wedge scatter matrix and a four-dimensional attenuation matrix.

14. The method of claim 8, further comprising:
    generating a plurality of scatter distributions based on geometric models having different object to detector distances;
    determining an imaged object to detector distance;
    selecting a scatter distribution based on the imaged object to detector distance; and
    employing the scatter distribution to scatter correct the projection data.

15. A system, comprising:
    a distribution calculator that generates a plurality of scatter distributions based on geometric models having different object to detector distances, wherein a scatter distribution of a geometric model includes a plurality of scatter distributions, and each of the plurality of scatter distributions respectively corresponds to a contribution of an individual ray at one or more pixels other than the pixel the ray impinges;
    a distance determiner that determines an imaged object to detector distance; and
    a scatter selector that selects a scatter distribution of the plurality of scatter distributions having a object to detector distance that corresponds to the imaged object to detector distance.

16. The system of claim 15, wherein the object to detector distance corresponds to one of a distance between a center region of a ray passing through the imaged object and the detector, a distance between a region where a ray passing through the imaged object exits the imaged object and the detector, or a center of gravity of the imaged object.

17. The system of claim 15, further comprising:
a wedge scatter correction matrix generator that generates a four-dimensional attenuation wedge scatter correction matrix used to correct the projection data for wedge scatter.

18. The system of claim 15, wherein the imaged object is located off center with respect to an axis of rotation of an imaging system imaging the object and the selected distribution takes into account the off center location of the imaged object.

19. A system, comprising:
a wedge scatter correction matrix generator that generates an estimate of wedge scatter by propagating a predetermined wedge scatter profile through an intermediate reconstruction of an object.

20. The system of claim 19, wherein the estimate includes a four-dimensional attenuation wedge scatter correction matrix, and further including:
a wedge scatter matrix generator that generates the wedge scatter profile, wherein the wedge scatter profile includes a four-dimensional wedge scatter matrix with an estimate for at least a subset of points on a two-dimensional (2D) wedge to a two-dimensional (2D) detector, with no attenuating object in an examination region between the wedge and the detector.

* * * * *